United States Patent
Cazier et al.

(10) Patent No.: US 7,466,321 B2
(45) Date of Patent: Dec. 16, 2008

(54) METHOD AND APPARATUS FOR THE CREATION OF CARTOON EFFECT VIDEOS

(75) Inventors: Robert P. Cazier, Ft. Collins, CO (US); Nathan M. Moroney, Palo Alto, CA (US); Murray D. Craig, Ft. Collins, CO (US); Pere Obrador, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 540 days.

(21) Appl. No.: 11/190,221

(22) Filed: Jul. 26, 2005

(65) Prior Publication Data

US 2007/0024633 A1     Feb. 1, 2007

(51) Int. Cl.
G09G 5/02       (2006.01)
G09G 5/36       (2006.01)
G06T 15/70      (2006.01)
H04N 5/225      (2006.01)
H04N 11/04      (2006.01)
H04N 5/46       (2006.01)
G06K 9/00       (2006.01)

(52) U.S. Cl. ............... 345/589; 345/593; 345/646; 345/473; 345/547; 348/169; 348/429.1; 348/557; 382/162; 382/165

(58) Field of Classification Search .......... 345/589, 345/593, 597, 601, 619, 646, 473, 538, 547, 345/549, 560, 553; 348/14.15, 46, 169, 174, 348/208.14, 253, 474, 429–430, 557, 567; 358/518, 524; 382/162–167
See application file for complete search history.

(56) References Cited

U.S. PATENT DOCUMENTS

| | | | |
|---|---|---|---|
| 5,731,794 A * | 3/1998 | Miyazawa | ............... 345/88 |
| 5,815,645 A | 9/1998 | Fredlund et al. | |
| 6,011,536 A | 1/2000 | Hertzmann et al. | |
| 6,101,293 A | 8/2000 | McKenzie | |
| 6,154,577 A | 11/2000 | Warnick et al. | |
| 6,285,468 B1 | 9/2001 | Cok et al. | |
| 6,317,192 B1 | 11/2001 | Silverbrook et al. | |
| 6,671,387 B1 | 12/2003 | Chen et al. | |
| 6,724,913 B1 | 4/2004 | Chen et al. | |
| 6,775,407 B1 | 8/2004 | Gindele et al. | |
| 6,795,585 B1 | 9/2004 | Parada et al. | |
| 2002/0024528 A1 * | 2/2002 | Lambertsen | ............ 345/646 |
| 2003/0189576 A1 * | 10/2003 | Pan et al. | ............... 345/589 |
| 2004/0258308 A1 | 12/2004 | Sadovsky et al. | |
| 2004/0263640 A1 | 12/2004 | Silverbrook | |

* cited by examiner

Primary Examiner—Wesner Sajous

(57) ABSTRACT

A user provides a plurality of video frames for processing, and selects a cartoon color palette. The color of all selected pixels within all selected video frames is changed to that of the closest match in color within the cartoon color palette and is stored in a memory. Optionally, the user may create a custom cartoon color palette, and may select less than all of the pixels in any given video frame for processing.

20 Claims, 2 Drawing Sheets

METHOD AND APPARATUS FOR THE CREATION OF CARTOON EFFECT VIDEOS

FIELD OF THE INVENTION

The present invention relates generally to the field of video image post-processing, and more particularly to the field of the creation of cartoon effect videos.

BACKGROUND OF THE INVENTION

Many current image capture devices include the ability to record video files. While many commercial software packages exist allowing users to artistically modify their still images, little such software currently allows artistic modification of video files. Given the current popularity of cartoons and other computer animation in motion pictures, users may desire to create their own custom cartoons, a difficult and lengthy process. Further, users may desire to convert their video files to give them the appearance of a cartoon or computer animation.

SUMMARY OF THE INVENTION

A user provides a plurality of video frames for processing, and selects a cartoon color palette. The color of all selected pixels within all selected video frames is changed to that of the closest match in color within the cartoon color palette and is stored in a memory. Optionally, the user may create a custom cartoon color palette, and may select less than all of the pixels in any given video frame for processing.

Other aspects and advantages of the present invention will become apparent from the following detailed description, taken in conjunction with the accompanying drawings, illustrating by way of example the principles of the invention.

DETAILED DESCRIPTION

Figure 1:
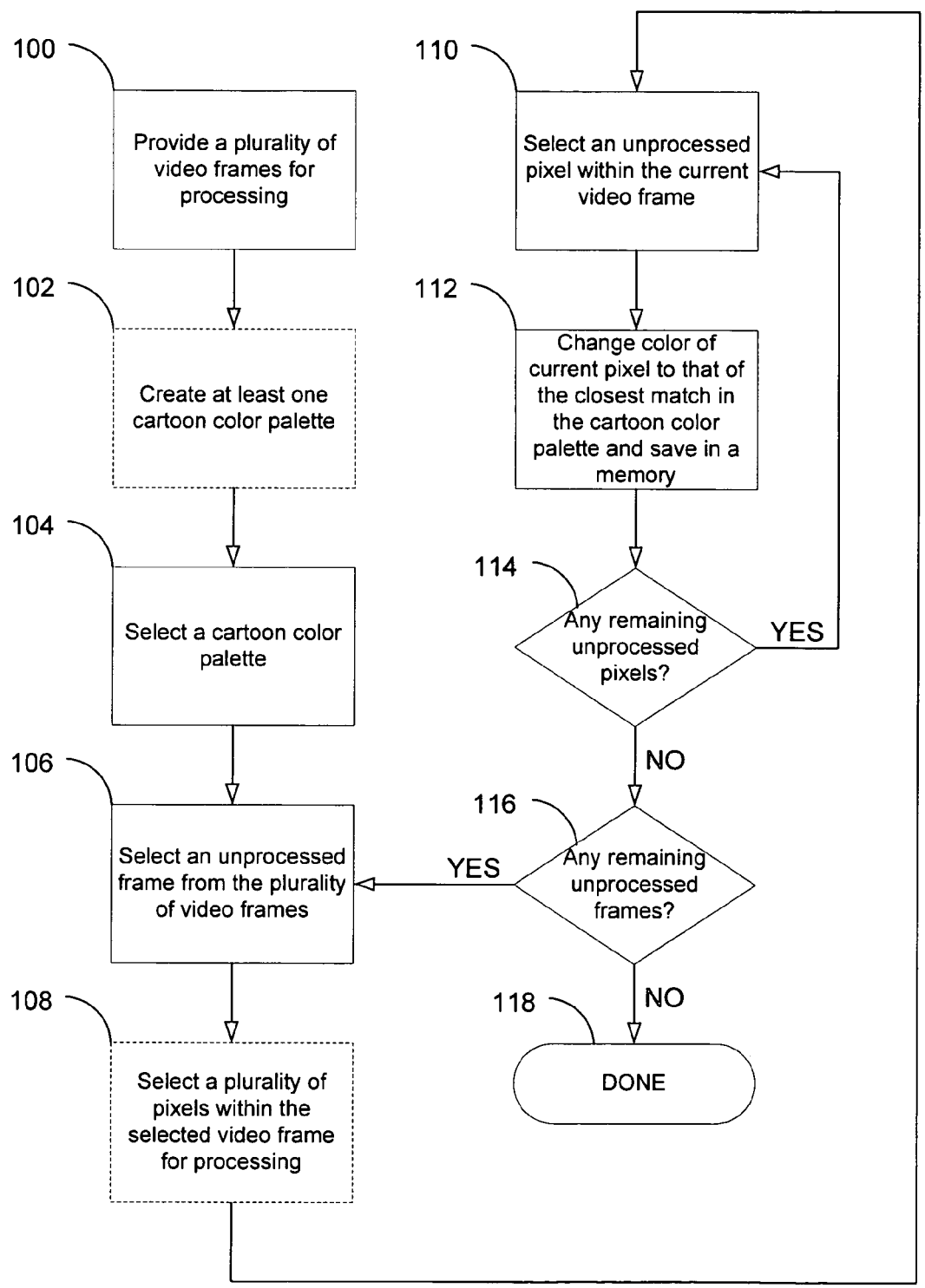
FIG. 1 is flow chart of an example embodiment of a method for the creation of cartoon effect videos according to the present invention.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

FIG. 1 is flow chart of an example embodiment of a method for the creation of cartoon effect videos according to the present invention. In a step 100, a plurality of video frames are provided for processing. These video frames may comprise an entire video file, or in some embodiments of the present invention, a subset of the video frames within a video file. In an optional step 102, at least one cartoon color palette is created. These cartoon color palettes may be created by a user, or the manufacturer may provide a selection of color palettes for use by end users of the invention. In a preferred embodiment of the present invention these color palettes contain less than 30 different colors, to reflect the limited palettes typically used in cartoons. Other embodiments of the present invention may use color palettes containing 30 or more different colors. In a step 104, a cartoon color palette is selected from the group of available cartoon color palettes. In a step 106, one of the plurality of video frames that has not yet been processed is selected for processing. In an optional step 108, a plurality of pixels within the selected video frame are selected for processing. Those of skill in the art will recognize that in some embodiments users may wish to "cartoonize" a portion of the video frame instead of the entire scene. In some embodiments of the present invention, the method will default to processing the entire video frame, while allowing a user to select to process less than all of the frame as an option. In a step 110, one of the pixels within the video frame is selected for processing. In a step 112, the color of the selected pixel is changed to that of the closest matching color within the cartoon color palette and saved in a memory. Those of skill in the art will recognize that this changed color may overwrite the color of the selected pixel in some embodiments of the present invention. In other embodiments of the present invention, these new cartoon colors may be stored in a different location in memory, while the original video frame remains unchanged. Those of skill in the art will recognize that there are a variety of ways to determine the closest matching color within the scope of the present invention. For example, using a three-dimensional color space, the closest matching color may be determined by calculating the distance from the color of the selected pixel to each color within the selected cartoon color palette, and then selecting the color with the shortest distance to the color of the selected pixel. In a decision step 114, if any unprocessed pixels remain in the selected video frame, control is returned to step 110, where another pixel is selected for processing. If all of the pixels within the frame have been processed, control is passed to decision step 116. In a decision step 116, if any unprocessed video frames remain, control is returned to step 106, where another frame is selected for processing. If all of the selected frames have been processed, the method ends at a step 118.

Figure 2A:
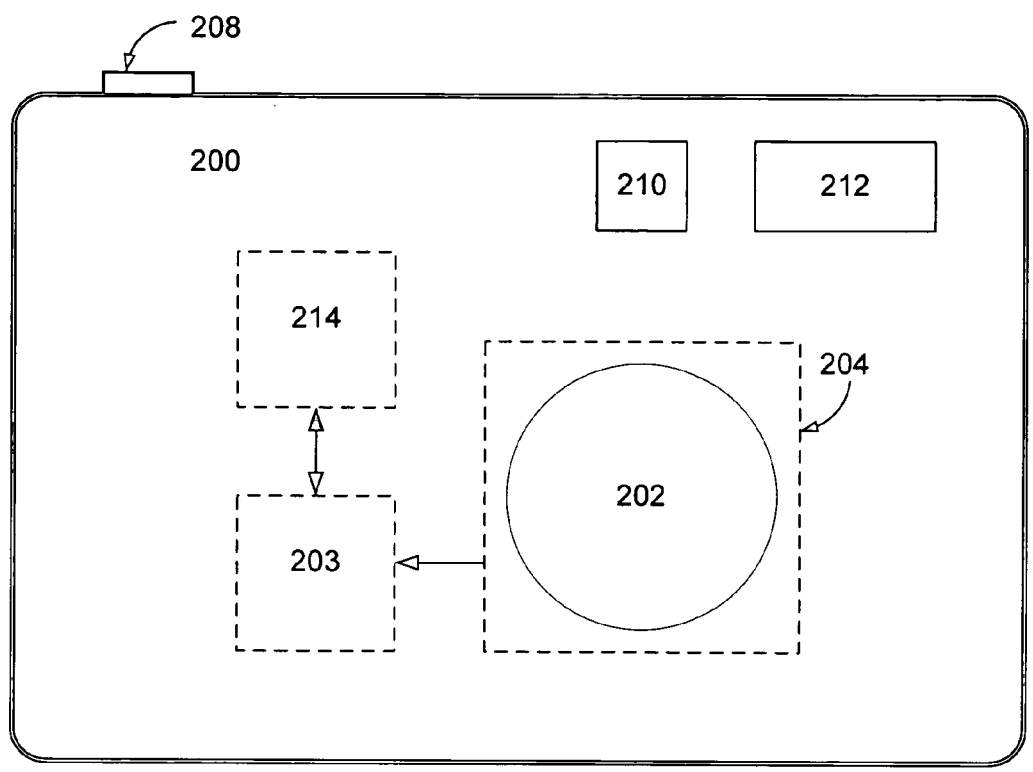
FIG. 2A is a front view of an example embodiment of a device for the creation of cartoon effect videos according to the present invention.

FIG. 2A is a front view of an example embodiment of a device for the creation of cartoon effect videos according to the present invention. In this example embodiment of the present invention, a body 200, including a lens 202, an image sensor 204, such as a CCD or CMOS sensor, a memory 206, a shutter button 208, an optical viewfinder 210, and a strobe 212, is configured to create cartoon effect videos. This digital camera 200 also includes a processor 214, electrically coupled with the memory 206, configured to create cartoon effect videos using the method described above and shown in the flowchart of FIG. 1. Those of skill in the art will recognize that a digital camera is but one of a variety of devices that may be configured to create cartoon effect videos from a selection of video frames within the scope of the present invention. For example, a computer may be used as an embodiment of the present invention where the video frames are captured by a separate image capture device and provided to the computer processor for creation of cartoon effects videos.

Figure 2B:
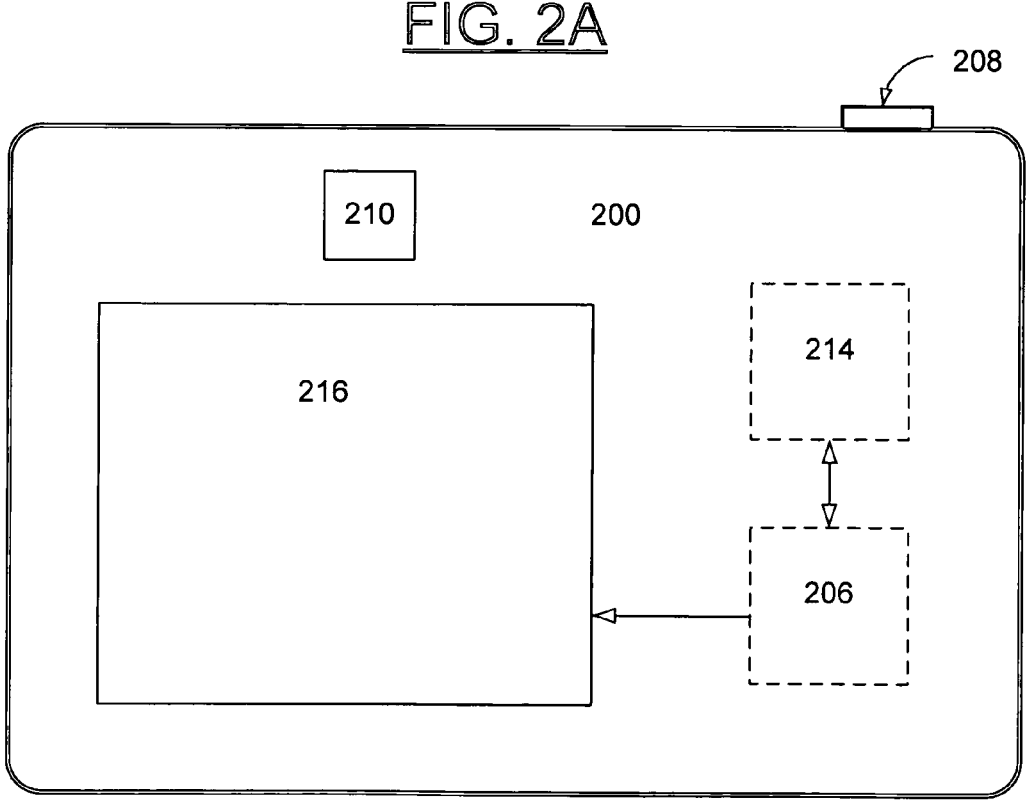
FIG. 2B is a rear view of an example embodiment of a device for the creation of cartoon effect videos according to the present invention.

FIG. 2B is a rear view of an example embodiment of a device for the creation of cartoon effect videos according to the present invention. In this example embodiment of the present invention, the body 200, also includes a viewfinder display 216, such as an LCD display used to show viewfinder images and other information such as user interface menus for control of the digital camera.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising the steps of:
   a) capturing a plurality of video frames with an image capturing device
   b) selecting a cartoon color palette;
   c) selecting an unprocessed video frame from the plurality of video frames;
   d) selecting an unprocessed pixel within the unprocessed video frame;
   e) cartoonizing the unprocessed video frame with the image capturing device by changing color of the unprocessed pixel to that of a closest color within the cartoon color palette;
   f) saving a processed pixel in a memory;
   g) checking for any remaining unprocessed pixels, and returning to step d) if any remain; and
   h) checking for any remaining unprocessed frames, and returning to step c) if any remain.

2. The method recited in claim 1, wherein the image capturing device is a digital camera.

3. The method recited in claim 1, wherein said step of saving a processed pixel in a memory overwrites an original pixel.

4. The method recited in claim 1, wherein said step of saving a processed pixel in a memory does not overwrite an original pixel.

5. The method recited in claim 1, further comprising: determining the closest color in the cartoon color palette by calculating a distance in color space from the color of a selected pixel to a color within the cartoon color palette.

6. A method comprising:
   capturing a plurality of video frames with a digital camera;
   selecting a cartoon color palette in the digital camera;
   selecting an unprocessed video frame from the plurality of video frames; and
   creating a cartoon effect video of the unprocessed video frame with the digital camera by changing colors of pixels in the unprocessed video frame to colors in the cartoon color palette.

7. The method recited in claim 6, further comprising: creating at least one cartoon color palette.

8. The method recited in claim 6, further comprising: overwriting the colors of pixels in the unprocessed video frame with the colors in the cartoon color palette.

9. The method recited in claim 6, wherein the colors in the cartoon color palette contain less than 30 different colors to reflect limited palettes used in cartoons.

10. The method recited in claim 6, further comprising: determining a closest color in the cartoon color palette by calculating a distance in color space from a color of a selected pixel to the colors within the cartoon color palette.

11. An image capturing device comprising:
    a body;
    a memory storing video images; and
    a processor within said body, electrically coupled to said memory, that:
    captures a plurality of video frames for processing;
    selects a cartoon color palette to cartoonize the plurality of video frames;
    selects an unprocessed video frame from the plurality of video frames; and
    creates a cartoon effect video frame from the unprocessed video frame by changing pixel colors in the unprocessed video frame with colors selected from the cartoon color palette.

12. The image capturing device recited in claim 11, wherein said processor allows a user to create at least one cartoon color palette.

13. The image capturing device recited in claim 11, wherein said processor overwrites an original pixel with a pixel processed with the cartoon color palette.

14. The image capturing device recited in claim 11, wherein said processor avoids overwriting an original pixel in the unprocessed video frame.

15. The image capturing device recited in claim 11, wherein said processor determines a closest color in the cartoon color palette by calculating a distance in color space from a color of a selected pixel to colors within the cartoon color palette.

16. A digital camera comprising:
    a body;
    a memory that stores a cartoon color palette and video images captured by the digital camera; and
    a processor within said body, electrically coupled to said memory, that:
    selects a plurality of unprocessed video frames to be cartoonized;
    creates a cartoon effect video from the unprocessed video frames by changing pixel colors in the unprocessed video frames with colors selected from the cartoon color palette.

17. The digital camera recited in claim 16, wherein said processor allows a user to create at least one cartoon color palette.

18. The digital camera recited in claim 16, wherein said processor overwrites original pixels in the unprocessed video frames with pixels having colors in the cartoon color palette.

19. The digital camera recited in claim 16, wherein said cartoon color palette contains less than 30 different colors to reflect limited palettes used in cartoons.

20. The digital camera recited in claim 16, wherein said processor determines a closest color in the cartoon color palette by calculating a distance in color space from a color of an original pixel in one of the unprocessed video frames with a color in the cartoon color palette.

* * * * *

UNITED STATES PATENT AND TRADEMARK OFFICE
CERTIFICATE OF CORRECTION

PATENT NO. : 7,466,321 B2
APPLICATION NO. : 11/190221
DATED : December 16, 2008
INVENTOR(S) : Robert P. Cazier et al.

It is certified that error appears in the above-identified patent and that said Letters Patent is hereby corrected as shown below:

In column 3, line 26, in Claim 1, after "device" insert -- ; --.

Signed and Sealed this

Fourteenth Day of April, 2009

JOHN DOLL
*Acting Director of the United States Patent and Trademark Office*